(12) United States Patent
Yang et al.

(10) Patent No.: US 10,921,639 B2
(45) Date of Patent: Feb. 16, 2021

(54) OPTICAL ELEMENT AND REFLECTION-TYPE LIQUID CRYSTAL DISPLAY SYSTEM USING THE SAME

(71) Applicant: BOE TECHNOLOGY GROUP CO., LTD., Beijing (CN)

(72) Inventors: Zezhou Yang, Beijing (CN); Ming Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 233 days.

(21) Appl. No.: 16/320,441

(22) PCT Filed: May 25, 2018

(86) PCT No.: PCT/CN2018/088434
§ 371 (c)(1),
(2) Date: Jan. 24, 2019

(87) PCT Pub. No.: WO2019/041911
PCT Pub. Date: Mar. 7, 2019

(65) Prior Publication Data
US 2021/0011339 A1     Jan. 14, 2021

(30) Foreign Application Priority Data
Aug. 31, 2017 (CN) .............................. 201710776139

(51) Int. Cl.
*G02F 1/1335* (2006.01)
*G02F 1/13357* (2006.01)
*G02B 5/04* (2006.01)

(52) U.S. Cl.
CPC ....... *G02F 1/133553* (2013.01); *G02B 5/045* (2013.01); *G02F 1/133615* (2013.01)

(58) Field of Classification Search
CPC ......... G02F 1/133553; G02F 1/133615; G02B 5/045
See application file for complete search history.

(56) References Cited

U.S. PATENT DOCUMENTS

| | | | |
|---|---|---|---|
| 6,822,705 B2 | 11/2004 | Shimoda et al. | |
| 2003/0076465 A1 | 4/2003 | Shimoda et al. | |
| 2013/0242610 A1* | 9/2013 | Ochi ....................... | G02B 6/00 362/611 |

FOREIGN PATENT DOCUMENTS

| | | |
|---|---|---|
| CN | 1460198 A | 12/2003 |
| CN | 103513321 A | 1/2014 |
| CN | 105954918 A | 9/2016 |
| CN | 105974657 A | 9/2016 |

(Continued)

OTHER PUBLICATIONS

Chinese Office Action dated Mar. 5, 2019, from application No. 201710776139.9.

(Continued)

*Primary Examiner* — Donald L Raleigh
(74) *Attorney, Agent, or Firm* — Arch & Lake LLP (57) ABSTRACT

The present disclosure provides an optical element used in a reflection-type liquid crystal display system. The optical element includes a substrate, and a plurality of prisms formed on a surface of the substrate and sequentially arranged along a first direction. Each of the plurality of prisms includes a plurality of sub-prisms sequentially arranged along the first direction with refractive indexes sequentially decreased.

20 Claims, 4 Drawing Sheets

(56) References Cited

FOREIGN PATENT DOCUMENTS

| | | |
|---|---|---|
| CN | 107367778 A | 11/2017 |
| JP | H10-246805 A | 9/1998 |
| JP | 2004-061543 A | 2/2004 |
| JP | 4067376 B2 | 3/2008 |
| JP | 2009-098400 A | 5/2009 |
| JP | 2009-146835 A | 7/2009 |
| JP | 2013-174648 A | 9/2013 |
| KR | 20110000200 A | 1/2011 |

OTHER PUBLICATIONS

International Search Report and Written Opinion dated Aug. 30, 2018, from application No. PCT/CN2018/088434.

* cited by examiner

OPTICAL ELEMENT AND REFLECTION-TYPE LIQUID CRYSTAL DISPLAY SYSTEM USING THE SAME

CROSS-REFERENCE TO RELATED APPLICATIONS

The present application is based upon International Application No. PCT/CN2018/088434, filed on May 25, 2018, which claims priority to Chinese Patent Application No. 201710776139.9, filed on Aug. 31, 2017, the entire contents of which are incorporated herein by reference.

TECHNICAL FIELD

The present disclosure generally relates to the field of display, and more particularly, to an optical element and a reflection-type liquid crystal display system using the optical element.

BACKGROUND

In conventional reflective liquid crystal display systems, an edge-lit light guide plate is used as a front light source system, most of emergent light is in a large angle direction, such that incident light entering liquid crystal glass is also in a large angle direction. After color separation through color film, three-color light reflected back may be unable to enter the color film of corresponding color because the reflection angle is larger, and thus a lot of light energy may be lost.

The above-mentioned information disclosed in this Background section is only for the purpose of enhancing the understanding of background of the present disclosure and may therefore include information that does not constitute a prior art that is known to those of ordinary skill in the art.

SUMMARY

The present disclosure is to provide an optical element and a reflection-type liquid crystal display system using the optical element.

Other features and improvements of the present disclosure will become apparent from the following detailed description, or in part, be acquired by practice of the present disclosure.

According to a first aspect of the present disclosure, there is disclosed an optical element used in a reflection-type liquid crystal display system. The optical element includes a substrate, and a plurality of prisms formed on a surface of the substrate. Each of the plurality of prisms comprises a plurality of sub-prisms arranged side by side along a first direction with refractive indexes sequentially decreased.

In an exemplary arrangement of the present disclosure, the plurality of prisms are separated from one another with a separation distance which is at least maintained so that a light propagation path corresponding to one of the plurality of prisms has no effect on respective light propagation paths corresponding to other prisms of the plurality of prisms.

In an exemplary arrangement of the present disclosure, the sub-prism having a maximum refractive index among the plurality of sub-prisms is larger than other sub-prisms in thickness.

In an exemplary arrangement of the present disclosure, a thickness of the sub-prism having the maximum refractive index among the plurality of sub-prisms is not less than a sum of respective thicknesses of the other sub-prisms.

In an exemplary arrangement of the present disclosure, the number of the plurality of sub-prisms is six.

In an exemplary arrangement of the present disclosure, a difference between the refractive indexes of any two adjacent sub-prisms among the plurality of sub-prisms is smaller than 0.05.

In an exemplary arrangement of the present disclosure, the plurality of prisms extend, on the surface of the substrate, along a second direction perpendicular to the first direction, and a length of the prism in the second direction is equal to that of the substrate in the second direction.

In an exemplary arrangement of the present disclosure, a cross section of each of the prisms taken by a plane extending along the first direction and perpendicular to the surface of the substrate is a rectangle.

In an exemplary arrangement of the present disclosure, a long side of the rectangle is perpendicular to the surface of the substrate.

In an exemplary arrangement of the present disclosure, a cross section of each of the prisms taken by a plane extending along the first direction and perpendicular to the surface of the substrate is an arc, and a convex surface of each of the prisms faces toward the first direction.

According to a second aspect of the present disclosure, there is provided a reflection-type liquid crystal display system. The reflection-type liquid crystal display system including a reflection-type liquid crystal panel, an optical element according to any one of the above arrangements arranged on a light exiting side of the reflection-type liquid crystal panel, and a light source and an edge-lit light guide plate arranged on a light exiting side of the optical element.

It is to be understood that both the foregoing general description and the following detailed description are exemplary and explanatory only and are not restrictive of the present disclosure.

This section provides a general summary of various implementations or examples of the technology described in the present disclosure, and is not a comprehensive disclosure of its full scope or all of its features.

BRIEF DESCRIPTION OF THE DRAWINGS

The above features and improvements of the present disclosure will become more apparent by describing in detail the exemplary arrangements thereof with reference to the accompanying drawings.

The accompanying drawings herein are incorporated in and constitute a part of this specification, illustrate arrangements conforming to the present disclosure and together with the description serve to explain the principles of the present disclosure. Apparently, the accompanying drawings in the following description show merely some arrangements of the present disclosure, and persons of ordinary skill in the art may still derive other drawings from these accompanying drawings without creative efforts.

DETAILED DESCRIPTION

Exemplary arrangements will be described more comprehensively by referring to accompanying drawings now. However, the exemplary arrangements may be carried out in various manners, and shall not be interpreted as being limited to the arrangements set forth herein. Furthermore, the described features, structures, or characteristics may be combined in any suitable manner in one or more arrangements. In the following description, numerous specific details are provided to provide a thorough understanding of the arrangements of the present disclosure. Those skilled in the art will recognize, however, that the technical solution of the present disclosure may be practiced without one or more of the specific details described, or that other methods, components, materials, etc. may be employed.

It is to be pointed out that in the accompanying drawings, sizes of layers and regions may likely be exaggerated for clarity of illustration. In addition, it may be understood that when an element or layer is referred to as being "on" another element or layer, it may be directly on the other element, or intervening layers may be present. Furthermore, it may be understood that when an element or layer is referred to as being "beneath" another element or layer, it may be directly beneath the other element, or at least one intervening layer or element may be present. Moreover, it also may be understood that when a layer or element is referred to as being "between" two layers or two elements, it may be unique layer between the two layers or two elements, or at least one intervening layer or element may be present. Throughout the specification, similar reference numerals indicate similar elements.

At present, in a part of the reflective liquid crystal display systems, multilayer scattering films specially designed may be additionally arranged to reduce the direction of large-angle emergent light from the edge-lit light guide plate. However, the use of the multilayer film materials makes the overall reflection-type liquid crystal display structure become complicated. Furthermore, the controllable light is limited in direction, and the angle can not be changed ideally.

Therefore, how to increase a light utilization efficiency of a front light source system used in the reflection-type liquid crystal display system is a technical problem to be solved urgently at present.

The present disclosure provides an optical element and a reflection-type liquid crystal display system in which the optical element is used. The optical element includes: a substrate; and a plurality of prisms formed on a surface of the substrate and sequentially arranged along a first direction. Any one of the plurality of prisms includes a plurality of sub-prisms sequentially arranged along the first direction with refractive indexes sequentially decreased. A prism array system composed of a plurality of prisms is additionally arranged between a light source and a reflection-type liquid crystal panel, each prism is composed of a plurality of sub-prisms, and refractive indexes of the plurality of sub-prisms gradually decrease from a near end to light source to a far end from light source. In this way, the deflection of an angle of emergent light from the light source may be effectively realized, the angle of the emergent light may be reduced, such that light entering liquid crystal glass is close to a vertical direction, the energy of exploitable light entering the reflection-type liquid crystal display system is enhanced, and the light utilization efficiency and the screen brightness of the reflection-type liquid crystal panel are increased.

Figure 1:
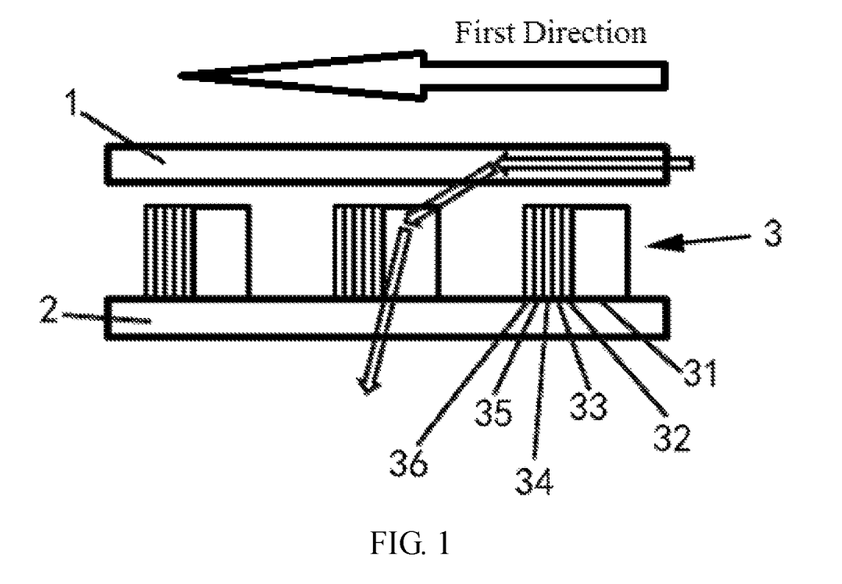
FIG. 1 illustrates an overall schematic structural side view of an optical element according to an exemplary arrangement of the present disclosure.
Figure 2:
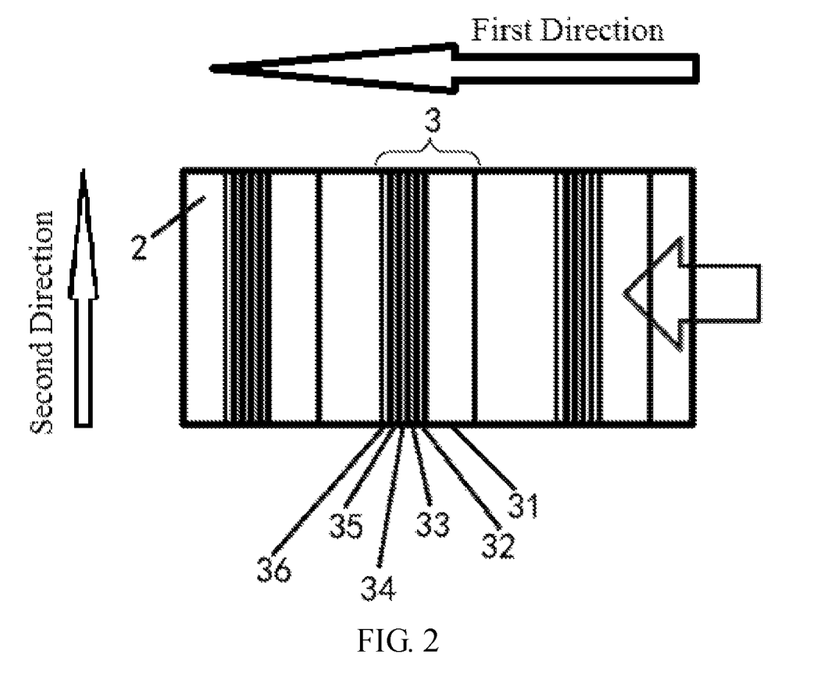
FIG. 2 illustrates an overall schematic structural top view of an optical element according to an exemplary arrangement of the present disclosure.
Figure 3:
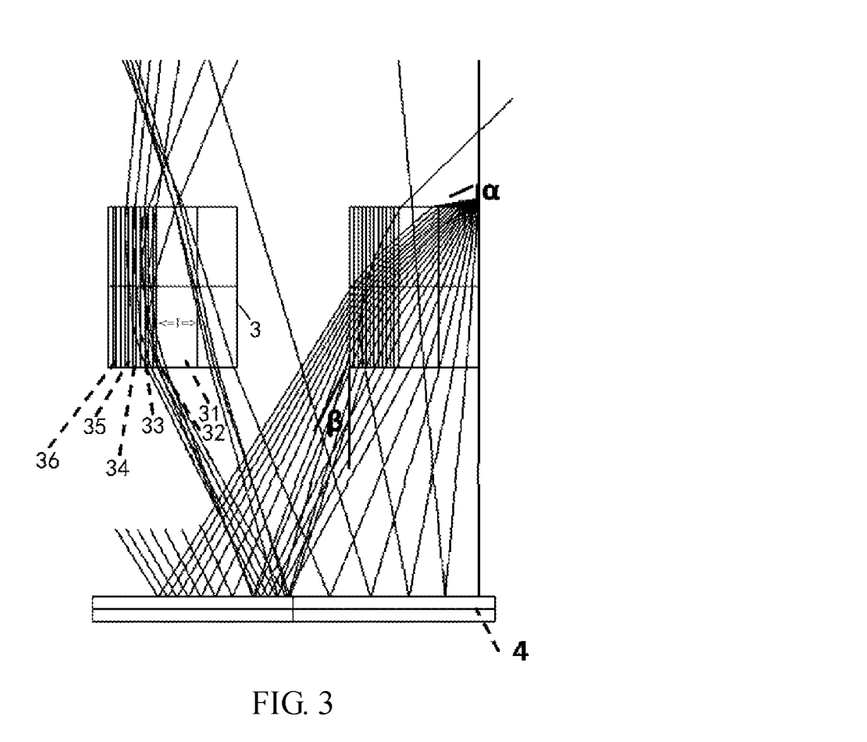
FIG. 3 illustrates a schematic side view of an optical path simulation of an optical element according to an exemplary arrangement of the present disclosure.
Figure 4:
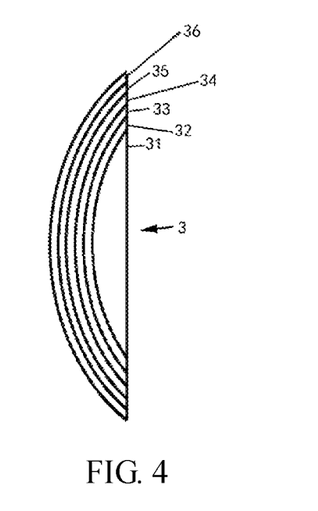
FIG. 4 illustrates a schematic side view of a prism in an optical element according to another exemplary arrangement of the present disclosure.
Figure 5:
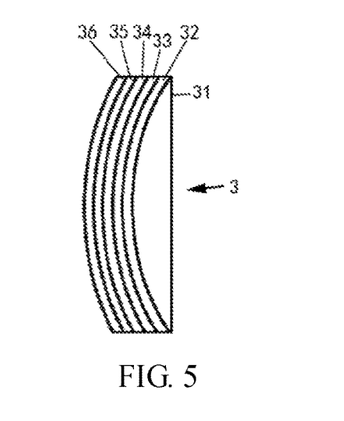
FIG. 5 illustrates a schematic side view of a prism in an optical element according to still another exemplary arrangement of the present disclosure.
Figure 6:
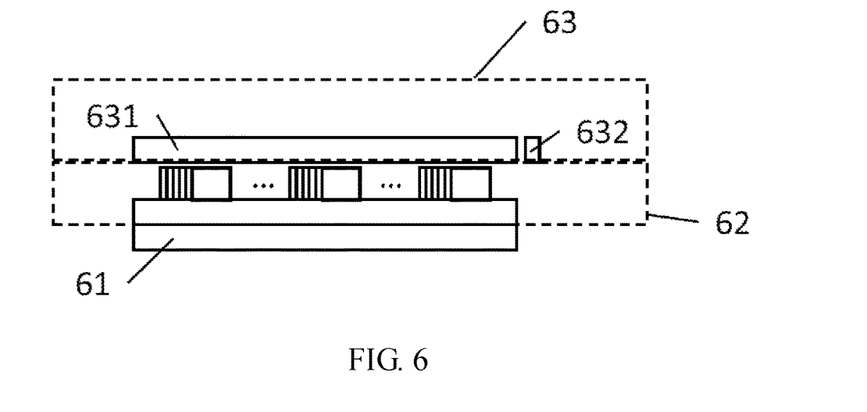
FIG. 6 illustrates a schematic diagram of a reflection-type liquid crystal display system according to an exemplary arrangement of the present disclosure.
Figure 7:
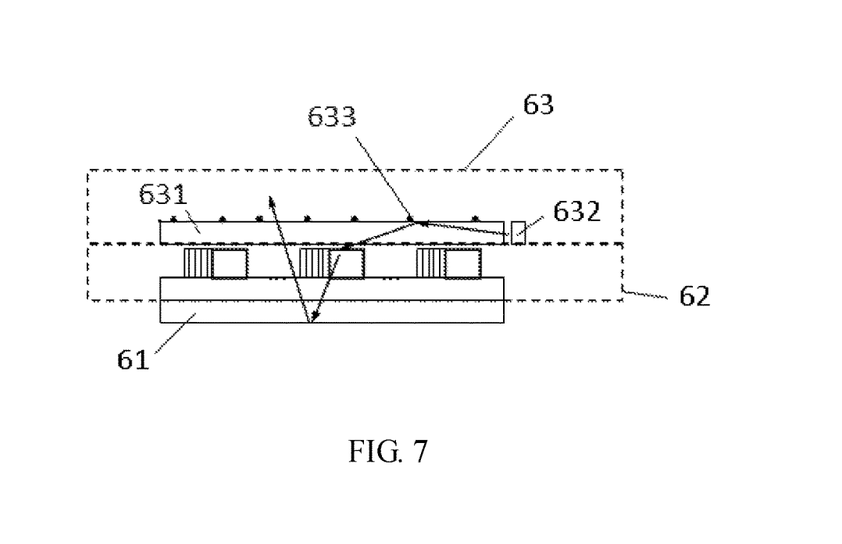
FIG. 7 illustrates a schematic diagram of a reflection-type liquid crystal display system according to another exemplary arrangement of the present disclosure.
Figure 8:
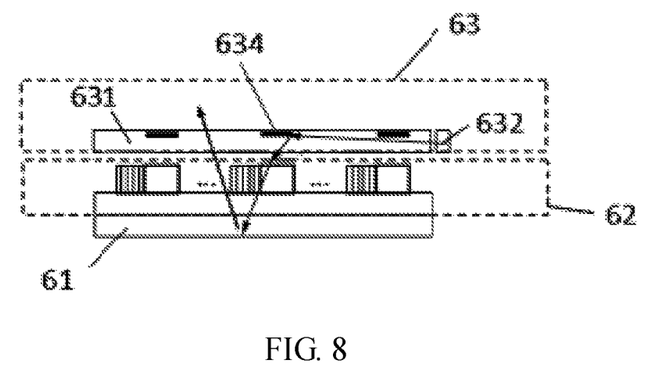
FIG. 8 illustrates a schematic diagram of a reflection-type liquid crystal display system according to still another exemplary arrangement of the present disclosure.

The optical element and the reflection-type liquid crystal display system in which the optical element is used provided by the present disclosure are described in detail with reference to the accompanying drawings, in which FIG. 1 illustrates an overall schematic structural side view of an optical element according to an exemplary arrangement of the present disclosure; FIG. 2 illustrates an overall schematic structural top view of an optical element according to an exemplary arrangement of the present disclosure; FIG. 3 illustrates a schematic side view of an optical path simulation of an optical element according to an exemplary arrangement of the present disclosure; FIG. 4 illustrates a schematic side view of a prism in an optical element according to another exemplary arrangement of the present disclosure; FIG. 5 illustrates a schematic side view of a prism in an optical element according to still another exemplary arrangement of the present disclosure; FIG. 6 illustrates a schematic diagram of a reflection-type liquid crystal display system according to an exemplary arrangement of the present disclosure; FIG. 7 illustrates a schematic diagram of a reflection-type liquid crystal display system according to another exemplary arrangement of the present disclosure; and FIG. 8 illustrates a schematic diagram of a reflection-type liquid crystal display system according to still another exemplary arrangement of the present disclosure.

FIG. 1 illustrates an overall schematic structural side view of an optical element according to an exemplary arrangement of the present disclosure. As shown in FIG. 1, the optical element arranged with respect to an edge-lit light guide plate 1 (however, the present disclosure is not limited thereto, which may be not the edge-lit light guide plate 1 but a direct light source emitting light at a certain angle) includes: a substrate 2, and a plurality of prisms 3 sequentially arranged along a first direction (no matter the edge-lit light guide plate or the direct light source emitting light at a certain angle is used, the first direction is a direction from a near end to light source (not shown in FIG. 1) to a far end from the light source). The prisms 3 includes a plurality of sub-prisms such as a sub-prism 31, a sub-prism 32, a sub-prism 33, a sub-prism 34, a sub-prism 35 and a sub-prism 36 sequentially arranged starting from a location closest to the near end to the light source. The refractive index of the sub-prism 31 is n, the refractive index of the sub-prism 32 is n1, the refractive index of the sub-prism 33 is n2, the refractive index of the sub-prism 34 is n3, the refractive index of the sub-prism 35 is n4, the refractive index of the sub-prism 36 is n5, and n>n1>n2>n3>n4>n5. The sub-prism 31, the sub-prism 32, the sub-prism 33, the sub-prism 34, the sub-prism 35 and the sub-prism 36 are sequentially arranged to form a complete prism 3. A plurality of prisms 3 form an array arranged on the surface of the substrate 2, and an air interface is provided between the prisms 3. In the prism according to the present disclosure, a plurality of sub-prisms with varied refractive indexes (for example, n, n1, n2, n3, . . . ) may be arranged, generally n>n1>n2>n3> . . . , and the refractive indexes thereof gradually decrease from the near end to the light source to the far end from the light source. Six sub-prisms are taken as an example in the following example.

FIG. 2 illustrates an overall schematic structural top view of an optical element according to the present disclosure. The optical element includes a substrate 2 and a prism 3. The prism 3 includes a sub-prism 31, a sub-prism 32, a sub-prism 33, a sub-prism 34, a sub-prism 35 and a sub-prism 36 sequentially arranged starting from a location closest to the near end to the light source. The sub-prism 31, the sub-prism 32, the sub-prism 33, the sub-prism 34, the sub-prism 35 and the sub-prism 36 are rectangular solids (a cross section of each prism taken by a plane extending along the first direction and perpendicular to the surface of the substrate is a rectangle, and a long side of the rectangle is perpendicular to the surface of the substrate), and extend, on the surface of the substrate, along a second direction perpendicular to the first direction, and a length of each of the sub-prisms 31, 32, 33, 34, 35 and 36 in the second direction is equal to that of the substrate in the second direction. The sub-prism 31, the sub-prism 32, the sub-prism 33, the sub-prism 34, the sub-prism 35 and the sub-prism 36 are sequentially arranged to form a complete prism 3 (the prism 3 is a rectangular solid or a cube, and the length of the prism 3 in the second direction is equal to that of the substrate 2 in the second direction). A plurality of complete prisms 3 form an array arranged on the surface of the substrate 2, and an air interface is provided between the prisms 3.

FIG. 3 illustrates a schematic side view of an optical path simulation of an optical element according to the present disclosure. The optical element includes a reflective substrate 4 and a prism 3. The prism 3 includes a sub-prism 31, a sub-prism 32, a sub-prism 33, a sub-prism 34, a sub-prism 35 and a sub-prism 36 sequentially arranged starting from a location closest to the near end to the light source. As a primary prism of the prism 3, the sub-prism 31 has a thickness T much larger than thicknesses of the other sub-prisms of the prism 3. The thicknesses of the other sub-prisms may be either equal or different, which is not specially limited as long as the thicknesses of the other sub-prisms are much smaller than the thickness of the sub-prism 31. The separation distance between two prisms 3 should be maintained so that light propagation path of one prism has no effect on light propagation path of another prism. That is, light refracted by a certain prism is not incident into other prisms adjacent to this prism. As can be seen from a simulated example, when an angle of incident light α=80°, an angle of emergent light β=30°, the light angle is greatly reduced, wherein n=1.3, n1=1.25, n2=1.2, n3=1.15, n4=1.1, n5=1.05, and an aspect ratio of the rectangular cross section of the sub-prism 31 is 0.4.

The refractive index n of the sub-prism 31 according to the present disclosure decides a light deflection angle, but a total reflection is not allowed to directly occur such that light deflects past a normal direction and is directed to another side. By calculation, it may be obtained n<1.414, the angle of emergent light is $\beta=\cos^{-1}\sqrt{n^2-1}$, and the aspect ratio is $$\tan\left(\sin^{-1}\left(\frac{\sin\beta}{n}\right)\right).$$

Furthermore, occurrence of unnecessary total reflection is avoided, and difference between refractive indexes at each layer should be smaller than 0.05.

In an exemplary arrangement of the present disclosure, the thickness of the sub-prism having the maximum refractive index among the plurality of sub-prisms of any prism is not less than sum of the thicknesses of the other sub-prisms.

FIG. 4 illustrates a schematic side view of a prism in an optical element according to another exemplary arrangement of the present disclosure. A cross section of each of the plurality of prisms 3 and of each of the plurality of sub-prisms (the sub-prism 31, the sub-prism 32, the sub-prism 33, the sub-prism 34, the sub-prism 35 and the sub-prism 36) taken by a plane extending along the first direction (i.e., the aforementioned direction from a near end to light source to a far end to light source) and perpendicular to the surface of the substrate is an arc. Convex surfaces of the plurality of prisms and of the plurality of sub-prism face toward the first direction, the refractive indexes are gradually decreased from a center of chord of the arc to outside of the arc, with a rule the same as that of the aforementioned cuboid optical prism. The refractive index of the sub-prism 31 is n, the refractive index of the sub-prism 32 is n1, the refractive index of the sub-prism 33 is n2, the refractive index of the sub-prism 34 is n3, the refractive index of the sub-prism 35 is n4, and the refractive index of the sub-prism 36 is n5, wherein n>n1>n2>n3>n4>n5.

In an exemplary arrangement of the present disclosure, a particular angle is formed between the prism as shown in FIG. 4 and the surface of the substrate to ensure that incident light is not incident from the convex surfaces of the sub-prisms.

FIG. 5 illustrates a schematic side view of a prism in an optical element according to still another exemplary arrangement of the present disclosure. As shown in FIG. 5, on the basis of the prism as shown in FIG. 4, two top ends of the prism are removed such that the sub-prisms have equal heights. However, the present disclosure is not limited thereto, the sub-prisms may have different heights.

The reflection-type liquid crystal display system of the present disclosure is described in detail with reference to FIG. 6.

FIG. 6 illustrates a schematic diagram of a reflection-type liquid crystal display system according to an exemplary arrangement of the present disclosure; As shown in FIG. 6, the reflection-type liquid crystal display system includes: a reflection-type liquid crystal panel 61; the optical element 62 according to any one of the foregoing arrangements arranged on the reflection-type liquid crystal panel; and a front light source 63 arranged on the optical element, wherein the front light source 63 includes an edge-lit light guide plate 631 and a light source 632. The light source is positioned on a light incident side of the edge-lit light guide plate or at the near end to the light source of the edge-lit light guide plate.

FIG. 7 illustrates a schematic diagram of a reflection-type liquid crystal display system according to another exemplary arrangement of the present disclosure. As shown in FIG. 7, a surface of a light-exiting side of the edge-lit light guide plate 631 has a plurality of ink dots 633. Light emitted from the light source 632 entering the edge-lit light guide plate 631 is scattered out by the ink dots 633. Incident light is incident from a side direction of the edge-lit light guide plate 631 at a larger angle, and thus the angle of emergent light is larger, such that after light enters the optical element 62, the angle of light may be narrowed. In this way, the light utilization efficiency is increased.

FIG. 8 illustrates a schematic diagram of a reflection-type liquid crystal display system according to still another exemplary arrangement of the present disclosure. An emergent light grating 634 is arranged between the edge-lit light guide plate 631 and the optical element 62. An orthographic projection of the emergent light grating 634 on the substrate 2 is positioned within an orthographic projection, on the substrate 2, of the sub-prism 31 having a maximum refractive index in the optical element 62. In this way, the emergent light from the light guide plate 631 is directional. Specifically, light is emitted from a prism (such as the sub-prism 31) having a higher refractive index to a prism (such as the sub-prism 32 or the sub-prism 33) having a lower refractive index. When a plurality of optical elements 62 are arranged, correspondingly a plurality of light gratings 634 may be arranged, wherein each optical element 62 corresponds to one emergent light grating 634.

In the reflection-type liquid crystal display system according to an exemplary arrangement of the present disclosure, an optical element including a plurality of prisms with varied refractive indexes is additionally arranged between the edge-lit light guide plate and the reflection-type liquid crystal panel, and the refractive indexes gradually decrease from the near end to light source to the far end from the light source. In this way, the angle of emergent light from the edge-lit light guide plate may be reduced, the energy of exploitable light entering the reflection-type liquid crystal display system is enhanced, and the light utilization efficiency and the screen brightness of the reflection-type liquid crystal panel are increased.

Through the above detailed description, those skilled in the art readily understand that the optical element and the reflection-type liquid crystal display system in which the optical element is used according to the arrangements of the present disclosure have one or more of the following improvements.

According to some arrangements of the present disclosure, a prism array system composed of a plurality of prisms is additionally arranged between a light source and a reflection-type liquid crystal panel, each prism is composed of a plurality of sub-prisms, and refractive indexes of the plurality of sub-prisms gradually decrease from a near end to light source to a far end from light source. In this way, the deflection of an angle of emergent light from the light source may be effectively realized, the angle of the emergent light may be reduced, such that light entering liquid crystal glass is close to a vertical direction, the energy of exploitable light entering the reflection-type liquid crystal display system is enhanced, and the light utilization efficiency and the screen brightness of the reflection-type liquid crystal panel are enhanced.

According to some arrangements of the present disclosure, the more the sub-prisms with varied refractive indexes are, i.e., the smaller the interface refractive index difference at each layer is, the better the deflection effect is because unnecessary totally reflected light may be reduced.

Other arrangements of the present disclosure will be apparent to those skilled in the art from consideration of the specification and practice of the disclosure disclosed here. This application is intended to cover any variations, uses, or adaptations of the present disclosure following the general principles thereof and including such departures from the present disclosure as come within known or customary practice in the art. It is intended that the specification and arrangements be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An optical element used in a reflection-type liquid crystal display system, comprising:
    a substrate; and
    a plurality of prisms formed on a surface of the substrate, wherein each prism of the plurality of prisms comprises a plurality of sub-prisms arranged side by side along a first direction with respective refractive indexes sequentially decreased along the first direction.

2. The optical element according to claim 1, wherein the plurality of prisms are separated from one another with a respective separation distance which is at least maintained so that a light propagation path corresponding to one prism of the plurality of prisms has no effect on light propagation paths corresponding to other prisms of the plurality of prisms.

3. The optical element according to claim 1, wherein a sub-prism of the plurality of sub-prisms of each prism having a maximum refractive index among the plurality of sub-prisms is larger than other sub-prisms of the plurality of sub-prisms in thickness.

4. The optical element according to claim 3, wherein a thickness of the sub-prism having the maximum refractive index among the plurality of sub-prisms is not less than a sum of respective thicknesses of the other sub-prisms.

5. The optical element according to claim 3, wherein a number of the plurality of sub-prisms is six.

6. The optical element according to claim 1, wherein a difference between the refractive indexes of two adjacent ones of the plurality of sub-prisms of each prism is smaller than 0.05.

7. The optical element according to claim 1, wherein the plurality of prisms extend, on the surface of the substrate, along a second direction perpendicular to the first direction, and a length of each of the plurality of prisms in the second direction is equal to a length of the substrate in the second direction.

8. The optical element according to claim 1, wherein a cross section of each of the plurality of prisms taken by a plane that extends along the first direction and is perpendicular to the surface of the substrate is a rectangle.

9. The optical element according to claim 8, wherein a long side of the rectangle is perpendicular to the surface of the substrate.

10. The optical element according to claim 1, wherein a cross section of each of the plurality of prisms taken by a plane that extends along the first direction and is perpendicular to the surface of the substrate is an arc, and a respective convex surface of each of the plurality of prisms faces toward the first direction.

11. A reflection-type liquid crystal display system, comprising:
    a reflection-type liquid crystal panel;
    an optical element arranged on a light exiting side of the reflection-type liquid crystal panel; and
    a light source and an edge-lit light guide plate arranged on a light exiting side of the optical element,
    wherein the optical element comprises a substrate; and a plurality of prisms formed on a surface of the substrate, and wherein any one of the plurality of prisms comprises a plurality of sub-prisms arranged side by side along a first direction with refractive indexes sequentially decreased along the first direction.

12. The reflection-type liquid crystal display system according to claim 11, wherein a light exiting surface of the edge-lit light guide plate has a plurality of ink dots.

13. The reflection-type liquid crystal display system according to claim 11, wherein an emergent light grating is arranged between the edge-lit light guide plate and the optical element.

14. The reflection-type liquid crystal display system according to claim 13, wherein an orthographic projection of the emergent light grating on the substrate is positioned within an orthographic projection, on the substrate, of a sub-prism of the plurality of sub-prisms that has a maximum refractive index in the optical element.

15. The reflection-type liquid crystal display system according to claim 11, wherein the plurality of prisms are separated from one another with a separation distance which is at least maintained so that a light propagation path corresponding to one of the plurality of prisms has no effect on respective light propagation paths corresponding to other prisms of the plurality of prisms.

16. The reflection-type liquid crystal display system according to claim 11, wherein a sub-prism of the plurality of sub-prisms of each prism having a maximum refractive index among the plurality of sub-prisms is larger than other sub-prisms of the plurality of sub-prisms in thickness.

17. The reflection-type liquid crystal display system according to claim 16, wherein a thickness of the sub-prism having the maximum refractive index among the plurality of sub-prisms is not less than a sum of respective thicknesses of the other sub-prisms.

18. The reflection-type liquid crystal display system according to claim 11, wherein a difference between the refractive indexes of two adjacent ones of the plurality of sub-prisms is smaller than 0.05.

19. The reflection-type liquid crystal display system according to claim 11, wherein a cross section of each of the prisms taken by a plane that extends along the first direction and is perpendicular to the surface of the substrate is a rectangle.

20. The reflection-type liquid crystal display system according to claim 11, wherein a cross section of each of the prisms taken by a plane that extends along the first direction and is perpendicular to the surface of the substrate is an arc, and a respective convex surface of each of the plurality of prisms faces toward the first direction.

* * * * *